(12) United States Patent
Patil et al.

(10) Patent No.: US 7,236,781 B2
(45) Date of Patent: Jun. 26, 2007

(54) METHOD FOR ROAMING BETWEEN NETWORKS

(75) Inventors: Basavaraj Patil, Coppell, TX (US); Kengatharan Sivalingam, Irving, TX (US)

(73) Assignee: Nokia Corporation, Espoo (FI)

( * ) Notice: Subject to any disclaimer, the term of this patent is extended or adjusted under 35 U.S.C. 154(b) by 50 days.

(21) Appl. No.: 11/142,665

(22) Filed: Jun. 2, 2005

(65) Prior Publication Data
US 2006/0003765 A1   Jan. 5, 2006

Related U.S. Application Data (60) Provisional application No. 60/576,848, filed on Jun. 2, 2004.

(51) Int. Cl.
*H04Q 7/20* (2006.01)
(52) U.S. Cl. ............. 455/432.1; 455/411; 455/435.2
(58) Field of Classification Search ............ 455/432.1, 455/411, 435.2, 544, 428, 432.2, 432.3
See application file for complete search history.

(56) References Cited

U.S. PATENT DOCUMENTS

2002/0007411 A1* 1/2002 Shaked et al. ............. 709/229
2002/0041605 A1* 4/2002 Benussi et al. ............. 370/467
2002/0133457 A1   9/2002 Gerlach et al.
2002/0141369 A1  10/2002 Perras
2005/0075129 A1* 4/2005 Kuchibhotla et al. ..... 455/552.1
2005/0213566 A1* 9/2005 Jutila et al. ................. 370/352
2005/0289347 A1* 12/2005 Ovadia ....................... 713/171
2006/0274695 A1* 12/2006 Krishnamurthi et al. .... 370/331

FOREIGN PATENT DOCUMENTS

EP     0 912 017 A3    4/1999

OTHER PUBLICATIONS

Hsu et al, "CDMA2000/GPRS Roaming Proposal," 3G, 3$^{rd}$ Generation Partnership Project 2, "3GPP2", Qualcomm, Feb. 2004, pp. 1-18.

* cited by examiner

*Primary Examiner*—CongVan Tran
(74) *Attorney, Agent, or Firm*—Squire, Sanders & Dempsey L.L.P.

(57) ABSTRACT

This invention relates to communication arrangements between communication networks, specifically to arrangements allowing networks of different types to cooperate. The invention provides a method for providing packet data services for a mobile station homed in a second wireless communication network in a first wireless communication network, where the first and second wireless communication networks are based on different standards.

6 Claims, 6 Drawing Sheets

METHOD FOR ROAMING BETWEEN NETWORKS

FIELD OF INVENTION

This invention relates to communication arrangements between communication networks, specifically to arrangements allowing networks of different types to cooperate.

TECHNOLOGICAL BACKGROUND

A communication system is a facility that enables communication between two or more entities such as user terminal equipment and/or network entities and other nodes associated with a communication system. The communication may comprise, for example, communication of voice, electronic mail (email), text messages, data, multimedia and so on.

The communication may be provided by fixed line and/or wireless communication interfaces. A feature of wireless communication systems is that they provide mobility for the users thereof. An example of a communication system providing wireless communication is a public land mobile network (PLMN). An example of the fixed line system is a public switched telephone network (PSTN).

A cellular telecommunication system is a communications system that is based on the use of radio access entities and/or wireless service areas. The access entities are typically referred to as cells. Examples of cellular telecommunication standards includes standards such as GSM (Global System for Mobile communications), GPRS (General Packet Radio Servers), AMPS (American Mobile Phone System), DAMPS (Digital AMPS), WCDMA (Wideband Code Division Multiple Access), UMTS (Universal Mobile Telecommunication System) and cdma2000 (Code Division Multiple Access 2000).

A communication system typically operates in accordance with a given standard or specification which sets out what the various elements of a system are permitted to do and how that should be achieved. For example, the standard of specification may define if the user, or more precisely user equipment is provided with a circuit switched service of a packet switched service or both. Communication protocols and/or parameters which should be used for the connection are also typically defined. For example, the manner in which communication shall be implemented between the user equipment and the elements of the communication network is typically based in a predefined communication protocol. In other words, a specific set of "rules" on which the communication can be based needs to be defined to enable the user equipment to communicate via the communication system. Typically, given standards will also define how authentication and authorisation mechanisms as well as how accounting systems should work.

The term "service" used in this document should be understood to broadly cover any service which a user may desire, require or be provided with. The term will also be understood to cover the provision of complementary services. In particular, but not exclusively, the term "services" will be understood to include internet protocol multimedia IM services, conferencing, telephony, gaming, rich call, presence, e-commerce and messaging for example, instant messaging, SMS and email.

It is desirable to provide users with the ability to roam. Roaming allows a user associated with a home network to leave the home network and enter a network operated by for example a different operator. In particular, it would be desirable to allow a user to roam between GSM/GPRS/UMTS and cdma2000 networks. Such roaming should enable access to both the circuit switched network as well as the packet data network. GPRS/UMTS networks are based on the architecture and standards developed by the third generation partnership projects (3GPP). The architecture of cdma2000 networks has been developed by the 3GPP2 organization. The packet data network architectures of these networks differ. Currently, users that are homed in one network can not roam into networks of another type and access packet data services. One of the reasons is that the authentication and authorisation mechanisms as well as the accounting systems in GPRS UMTS and cdma2000 networks are quite different even if the mobile terminal had the necessary radio/air-interface technology.

Qualcomm has proposed one method to deal with this issue in "CDMA/GPRS roaming proposal", by R. Hsu and J. Nasielski, Qualcomm, February 2004. In this proposal, an interworking and interoperability function (IIF) is used to convert all messages back and forth between the networks. The solution assumes that GGSNs in GPRS network supports FA (foreign agent) functionality and MIPv4. For performing Simple IP service in a GPRS network, the proposal establishes a PPP session via L2TP back to the cdma2000 home network. All data traffic is routed through the IIF and the home cdma2000 system. This proposal has certain problems. The solution does not utilize some of the more recent developments in the network architecture of 3GPP networks. Using a gateway such as the IIF to manage all messaging between the networks has a number of limitations:

1. The solution is complex. Emulating functions such as the GGSN, Foreign Agent, LAC and other functions adds a great deal of complexity. It also requires the gateway to maintain state for a large number of mobile users and hence scalability becomes an issue.
2. The solution is telecom centric. The architecture in the proposal is based on a roaming model that has existed in circuit-switched mobile networks for a brig time. Since the problem being addressed here is one of packet data network roaming, it is preferable to look at it from the perspective of how such roaming has been accomplished in ISP networks.
3. The solution has a single point of failure. An IIF becomes a single point of failure and hence not suitable for enabling such roaming. A more distributed architecture that utilizes the appropriate network elements is better suited.
4. The solution requires emulation. The IIF in this solution must emulate a number of different functions such as the Mobile IPv4 Foreign Agent, a GGSN and PDSN functions. Such emulation is tantamount to replicating the network elements that support packet data service in GPRS/UMTS and cdma2000 in the IIF.

A solution with minimum number of changes to the GPRS/UMTS and cdma2000 standards is needed in order to provide seamless roaming for subscribers roaming in between these networks.

LIST OF ACRONYMS

CDMA code division multiple access
FA foreign agent
GGSN Gateway Gprs Support Node
GPRS general packet radio service
GSM Global System for Mobile Communications
GSM-MAP GSM mobile application part IIF interworking and interoperability function
IP internet protocol
IS41-MAP IS41 mobile application part
ISP Internet service provider
L2TP layer 2 tunneling protocol
LAC location area code
MIPv4 Mobile IPv4
MIPv6 Mobile IPv6
NAI Network Access Identifier
PDSN Packet Data Serving Node
PPP point-to-point protocol
SGSN Serving GPRS Support Node
V-AAA Visited AAA Server

SUMMARY OF THE INVENTION

Embodiments of the present invention aim to overcome one or several of the above problems.

According to one aspect of the invention, a method for supporting roaming of a mobile station using packet data connections in a cellular telecommunications network is provided. The method comprises the steps of
  receiving a connection initiation message from a mobile station by a serving node,
  sending a challenge message to the mobile station,
  receiving a response to the challenge from the mobile station by the serving node,
  extracting an identifier associated with the mobile station from the received response,
  sending an access request to an authentication node of the cellular telecommunications network, the access request including the extracted identifier,
  determining whether the extracted identifier is associated with a second telecommunications network, and if it is, forwarding the access request by the authentication node to a second authentication node in the second telecommunications network,
  sending an accounting start request from the serving node to the authentication node of the cellular telecommunications network, and
  if the extracted identifier was determined to be associated with a second telecommunications network, sending an accounting start request to the second authentication node in the second telecommunications network.

The method can further comprise the step of converting information in the accounting start request received from the serving node to a second format employed by the second authentication node for transmission to the second authentication node in an accounting start request.

The cellular telecommunications network can be a CDMA network and the second telecommunications network can be a GPRS network.

The identifier associated with the mobile station can be a network access identifier.

The step of converting can be performed by the authentication node of the cellular telecommunications network.

According to a second aspect of the invention, a method for supporting roaming of a mobile station using packet data connections in a telecommunications network is provided. The method comprises the steps of
  receiving a packet data connection request message from a mobile station,
  extracting an access node identifier from the received request message,
  determining on the basis of an extracted access node identifier at least the identity of an authentication node in a second telecommunications network,
  sending an access request message to the authentication node in the second telecommunications network,
  receiving a response message from the authentication node in the second telecommunications network, and
  sending an accept message to the mobile station if the response message from the authentication node in the second telecommunications network indicated a successful authentication.

According to a third aspect of the invention, a method for providing packet data services in a cellular communications network is provided. The method comprises the steps of
  receiving a request for joining the network from a mobile station,
  determining whether the mobile station is homed in a second cellular communications network,
  if the mobile station is homed in a second cellular communications network, transmitting an authentication request for authenticating the mobile station to an interworking function translating messages between a first protocol used by the cellular communications network and a second protocol used by the second cellular communications network, said first and second protocols being different protocols,
  receiving a request for a packet data connection from the mobile station,
  transmitting a request for authorization for a packet data connection for the mobile station to an authorization node in the cellular communications network, and
  if the mobile station is homed in the second cellular communications network, transmitting an authorization request to an authorization node in the second cellular communications network by the authorization node in the cellular communications network.

The method can further comprise the steps of
  receiving an authorization accept message from the authorization node in the cellular communications network by a network node in the cellular communications network,
  transmitting, as a response to reception of the authorization accept message, an accounting start notification related to the requested packet data connection to a first accounting node in the cellular telecommunications network by the network node, and
  if the mobile station is homed in the second cellular communications network, transmitting an accounting start notification related to the requested packet data connection to a second accounting node in the second cellular telecommunications network by the first accounting node in the cellular telecommunications network.

The second cellular communications network can be a 3GPP2 network.

The cellular communications network can be a GPRS network.

According to a fourth aspect of the invention, a system for providing packet data services for a cellular communications network is provided. The system comprises
  a controller for determining whether a mobile station is homed in a second cellular communications network as a response to receiving a request for joining the network from the mobile station,
  a message transmitter for transmitting an authentication request, as a response to determining that the mobile station is homed in a second cellular communications network, to an interworking function for authenticating the mobile station, the interworking function translating messages between a first protocol used by the cellular communications network and a second protocol used by the second cellular communications network, said first and second protocols being different protocols, a message transmitter for transmitting an authorization request to an authorization node in the second cellular communications network as a response to receiving a request for a packet data connection from the mobile station.

The system can further comprise a message transmitter for transmitting, as a response to reception of an authorization accept message, an accounting start notification related to the requested packet data connection a first accounting node in the cellular telecommunications network, and a message transmitter in the first accounting node for transmitting an accounting start notification to a second accounting node in the second cellular telecommunications network as a response to receiving an accounting start notification related to a mobile station homed in the second cellular communications network.

BRIEF DESCRIPTION OF THE DRAWINGS

Embodiments of the present invention will now be described by way of example with reference to the accompanying drawings, in which.

DETAILED DESCRIPTION OF EMBODIMENTS

Roaming between the two types of networks (for example, between GPRS/UMTS and cdma2000) can be accomplished by using an IIF for MAP level interworking and using AAA network elements (such as RADIUS servers) in both networks to enable co-operation of authentication, authorization and accounting functions of these two networks.

The invention proposes the use of AAA (Authentication, Authorization and Accounting) infrastructures as well as the IIF (Interworking and Interoperability Function) to enable roaming of users between two networks such as GPRS/UMTS and cdma2000 networks and access packet data services. The invention allows packet data roaming between two networks with only minimal changes to the signalling in the two networks. The IIF serves as the gateway to communicate between the core network protocols, in the case of GPRS/UMTS and cdma2000 networks the GSM-MAP and IS41-MAP protocols. It is known that 3GPP networks can deploy AAA servers for various reasons as described in 3GPP 29.071.

In an embodiment, a Radius based AAA server is deployed in the GPRS/UMTS home network. With the inclusion of such AAA capability in 3GPP based networks, it is possible to enable roaming with 3GPP2 based networks which also have an AAA infrastructure in their packet data networks.

The key problems to be solved to enable such roaming between two networks of different type are authentication, as the authentication methods vary between networks of different type; authorization, as the protocols used to approve access to a service also vary; and accounting, as the accounting record formats as well as the protocols used in accounting vary.

It is assumed that the mobile nodes in the following description are multi-mode mobiles, i.e. they support the air interfaces of both networks. For example, the mobile node is assumed to be able to comply with the signalling specified in the 3GPP standards or the 3GPP2 standards when attaching to a GPRS/UMTS network or a cdma2000 network.

The packet data network in cdma2000 architectures essentially rely on a Radius based AAA infrastructure for authentication, authorization and accounting functions. While the GPRS/UMTS networks do have support for Radius for certain functions, the authentication, authorization and accounting functions are typically performed by the HLR/AuC and charging gateway elements. The 3GPP specification TS 29.061 includes support for Radius as well as Mobile IPv4 in GPRS networks. Additionally, Release 6 of the 3GPP specifications includes support for an AAA server in the core network of GPRS/UMTS architecture.

Figure 1:
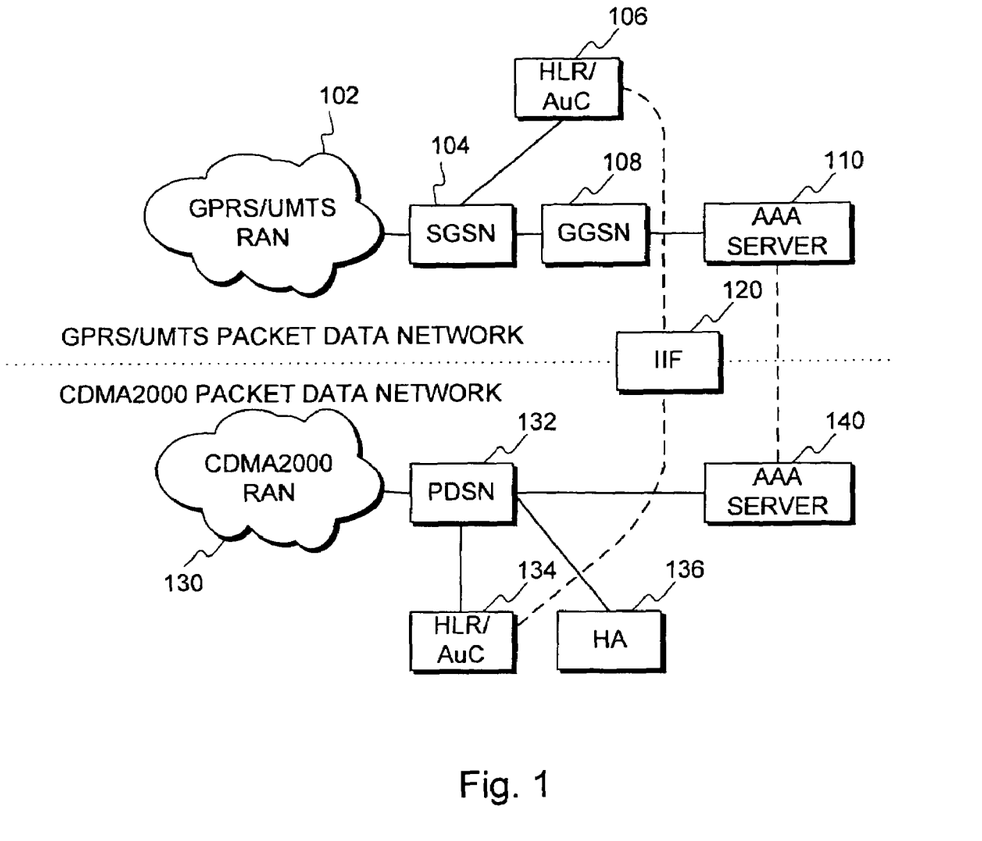
FIG. 1 illustrates an example of an architecture for supporting packet level roaming between two networks.

FIG. 1 illustrates an example of an architecture for supporting packet level roaming between two networks, in this example between GPRS/UMTS and cdma2000 networks. FIG. 1 shows on the GPRS network side a GPRS/UMTS radio access network (RAN) 102, a serving GPRS support node (SGSN) 104, a home location register/authentication center (HLR/AuC) 106, and an AAA server 110. An IIF node 120 connects the two networks. On the cdma2000 side, FIG. 1 shows a cdma2000 radio access network (RAN) 130, a packet data serving node (PDSN) 132, a home location register/authentication center (HLR/AuC) 134, a home agent (HA) 136, and an AAA server 140. Mobile stations (not illustrated in FIG. 1) communicate with base stations in the radio access networks 102, 130.

For clarity, FIG. 1 illustrates only certain network nodes pertinent to the description of embodiments of the invention, and omits many other nodes typically present in a cellular communications network. It should also be appreciated that the connections between the various entities shown in FIG. 1 may be different in alternative embodiments of the present invention. In some embodiments of the present invention, some of the elements may be omitted.

Access to the packet data network in GPRS/UMTS requires authentication and authorization by the HLR/AuC. In the case of cdma2000 networks access authentication involves both the HLR/AuC as well as AAA authentication. It should also be noted that GSM-MAP and IS41-MAP protocols employed in the two networks are incompatible. Hence communication between the HLR/AuCs of the two networks is mediated via an IIF node 120 which translates the messages. The AAA infrastructures can advantageously be based on the Radius protocol. The Radius protocol is specified in an IETF standard document RFC 2865. A Radius server (AAA Server) is used in an embodiment of the invention in GPRS/UMTS networks to support cdma2000 packet data foreign mode, i.e. to support a GPRS homed subscriber roaming in a cdma2000 network. The Radius server in the GPRS/UMTS network needs to include subscriber profiles of those users who need the capability of roaming in cdma2000 networks. Roaming between cdma2000 and GPRS/UMTS networks is realized by arranging the AAA infrastructures of the two networks to interoperate.

In the following, a number of scenarios for packet data roaming are presented. These scenarios describe GPRS/UMTS packet data foreign mode and cdma2000 packet data foreign modes of operation.

In the first scenario, a GPRS/UMTS homed subscriber roams in a cdma2000 network and attaches to the packet data network.

The cdma2000 packet data network offers multiple types of packet data services. These are simple IPv4, simple IPv6, mobile IPv4, and mobile IPv6 (In revision D of the specification TIA-835). According to prior art, GPRS/UMTS mobile stations do not generally use Mobile IP when operating in their native mode. Hence support for Mobile IP in mobile stations when roaming in the cdma2000 network is not absolutely necessary for mobile stations using cdma2000 packet data foreign mode. Additionally the cdma2000 network specifies support for Simple IPv4/v6 and Mobile IP services as being mandatory in the core network, while these requirements are optional in the mobile stations according to cdma2000 specifications. Hence GPRS/UMTS mobile stations can utilize the simple IP services of the cdma2000 network when roaming in those networks.

The scenarios to be considered for supporting roaming in the case of GPRS/UMTS packet data foreign mode are simple IPv4 service, and simple IPv6 service. A drawback of using only the simple IP services when roaming in cdma2000 networks is the fact that a session will be dropped when the mobile station moves from one PDSN to another.

Figure 2:
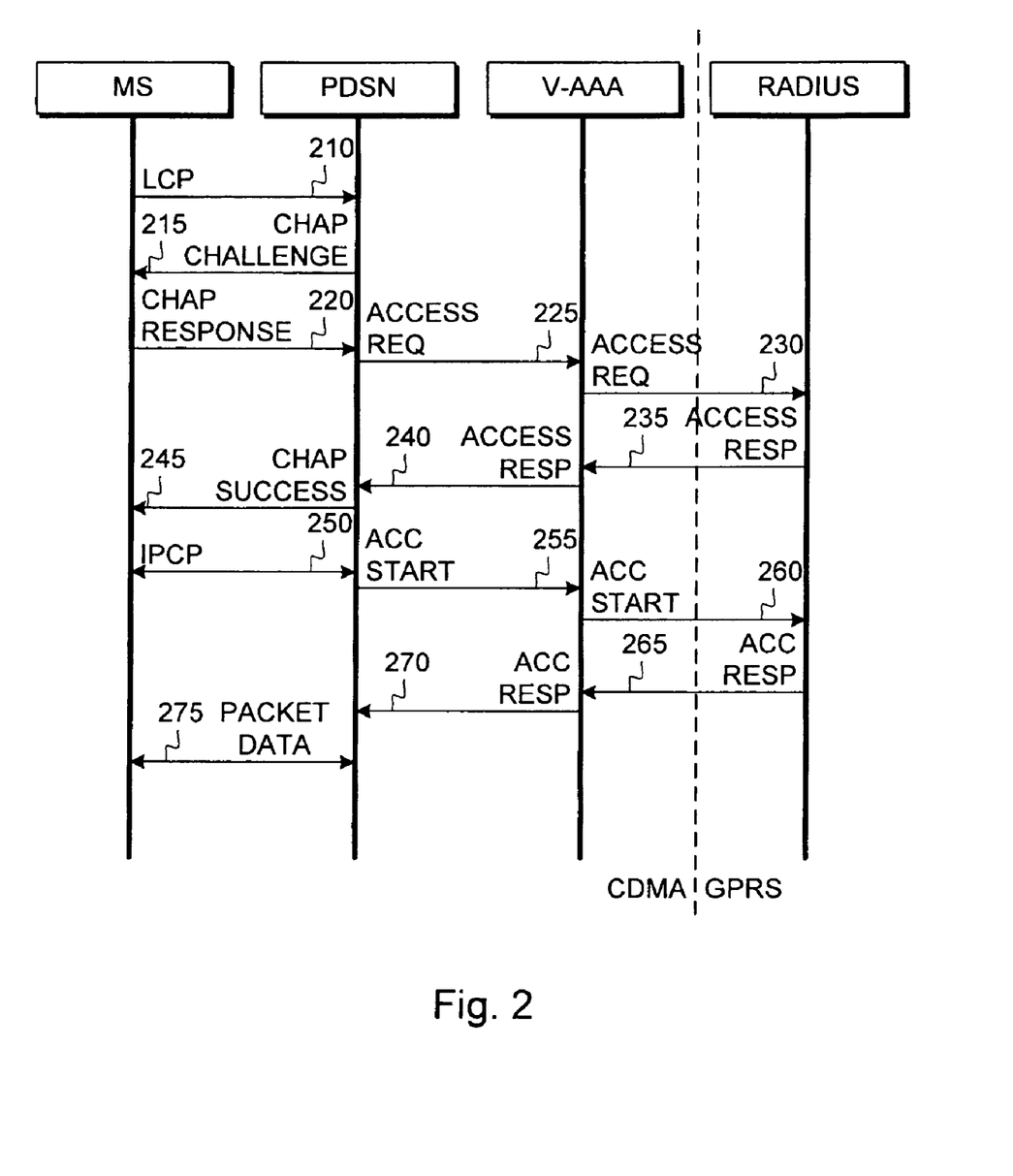
FIG. 2 illustrates how packet data authentication and access for simple IPv4 service can be enabled in cdma2000 for a roaming GPRS subscriber.

FIG. 2 illustrates how packet data authentication and access for simple IPv4 service can be enabled in cdma2000 for a roaming GPRS subscriber according to an embodiment of the invention.

In step 210, the mobile station (MS) initiates PPP LCP negotiation with the PDSN. In step 215, the PDSN sends a CHAP challenge to the MS. In step 220, the MS replies with its NAI (network access identifier) and a challenge response. The PDSN sends 225 a RADIUS Access-Request to an AAA server V-AAA. Because the domain name of the NAI of the mobile station indicates that the mobile station is homed in a GPRS system, the RADIUS Access Request is forwarded 230 by the V-AAA to a radius server in the GPRS system.

In step 235, if the authentication is successful, the Radius Server responds with a RADIUS Access-Accept message. The message is forwarded 240 to the PDSN by the V-AAA. In step 245, the PDSN indicates to the MS that the CHAP authentication was successful. In step 250, PPP IPCP negotiation is performed, whereby a new IP address is assigned to the MS.

In step 255, the PDSN sends the RADIUS Accounting-Request (Start) message containing 3GPP2 packet data accounting information. Because the domain name of the NAI of the mobile station indicates that the mobile station is homed in a GPRS system, the message is forwarded 260 by the V-AAA to the Radius Server in the GPRS system.

In an embodiment, the V-AAA includes the functionality of mapping the 3GPP2 packet data accounting information to 3GPP format before sending the accounting information to the Radius Server in the GPRS network. In a further embodiment, the V-AAA can use an external node to map this accounting information.

In step 265 the radius server in the GPRS network replies with the RADIUS Accounting-Response (Start) message. In step 270, the response message is forwarded to the PDSN. After this, the establishment of a packet data connection between the MS and the PDSN is complete, and packet data can flow as indicated in step 275.

Provision of simple IPv6 service can be performed in a similar way to the provision of simple IPv4 service as illustrated in FIG. 2. If the MS decides to use simple IPv6 service, it initiates the IPv6CP negotiation with the PDSN. The MS can construct the link-local IPv6 address by prepending the link local prefix to the interface-identifier received during the IPv6CP negotiation phase. The MS can construct the global and site-local IPv6 addresses by prepending the prefixes received from the Router Advertisements to the interface identifier received during the IPv6CP negotiation.

If the MS needs to tunnel all data via the home network, it can create a VPN tunnel to a VPN gateway located in the GPRS network. The address of the VPN gateway can be for example preconfigured in the MS or be informed to the MS during PPP setup. The VPN gateway information can be provided for example by the AAA server in the GPRS network.

The following examples provide a description of how a CDMA mobile station can roam in a GPRS network.

Cdma2000 homed subscribers can roam in a GPRS/UMTS network and access packet data services via the GPRS packet data network which comprises the SGSN and GGSN network nodes. Currently, GPRS/UMTS networks do not generally offer Mobile IP service. However the specifications for GPRS/UMTS do support Mobile IPv4 capability. However, the mobility model in GPRS/UMTS is different from the one used in cdma2000 packet data networks.

A cdma2000 mobile station operating while attached to a GPRS/UMTS network is referred to as being in GPRS/UMTS foreign mode. The cdma2000 mobile station can access simple IPv4 service, simple IPv6 service, or mobile IPv4 service either using a foreign agent (FA) or in co-located care-of-address (CCOA) mode. The scenarios to be considered in the case of GPRS/UMTS foreign mode of operation are simple IPv4 service, simple IPv6 service, mobile IPv4 service using a Foreign Agent, and mobile IPv4 service using a co-located Care-of-address service. These scenarios are described in more detail in the following.

Figure 3:
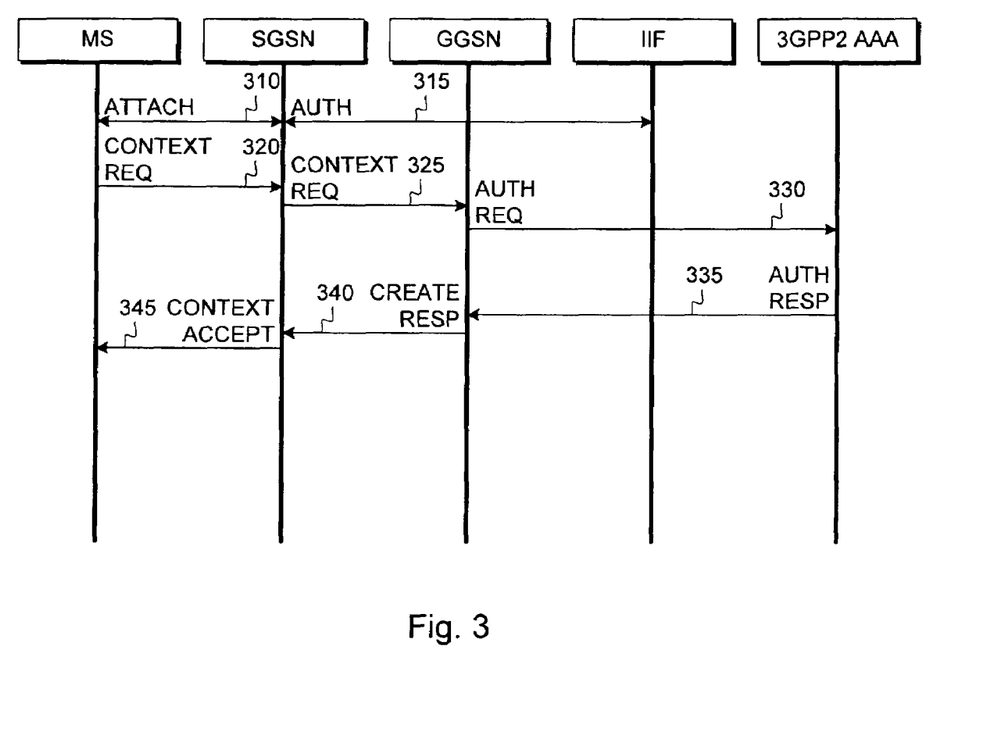
FIG. 3 illustrates provision of simple IPv4 service in GPRS/UMTS packet data foreign mode.

The following scenario describes provision of simple IPv4 Service in GPRS/UMTS foreign mode with reference to FIG. 3.

In step 310, the mobile station attaches to the GPRS network via the GPRS ATTACH procedure. As the SGSN observes that the mobile station is homed in a cdma2000 network, the SGSN authenticates 315 the mobile station via the IIF node.

In step 320 the mobile station sends an Activate PDP context request message to the SGSN, including the Protocol Configuration Options. The SGSN sends 325 the Create PDP context request message to the chosen GGSN including the Protocol Configuration Options.

The GGSN deduces from the APN (Access Point Name) included in the message a) the server(s) to be used for address allocation, authentication and retrieval of protocol configuration options, b) the protocol (such as RADIUS) to be used with the server; and c) the communication and security features needed to communicate with this server. Such features can comprise e.g. tunnelling information, IPSec security association information, or information required for a dial-up connection (using possibly PPP). This information allows the GGSN to transmit 330 an authentication request to the AAA server in the cdma2000 network, which replies 335 with an authentication response message.

In step 340 the GGSN sends back to the SGSN a Create PDP Context Response message, containing the Protocol Configuration Options IE (information element). The message includes an indication of the outcome of the host authentication, and configuration information.

In step 345, depending on the results received in the Create PDP Context Response, the SGSN sends either an Activate PDP Context Accept or an Activate PDP Context Reject to the mobile station. In a successful case, the mobile station can then begin transmitting packets using the established PDP context.

The IP address can advantageously be allocated to the MS from the address pool of the GGSN itself. The IP address can be established for example using a DHCP mechanism.

If the policy of the mobile station requires that all data be tunnelled back via the home network, this can be accomplished via various different mechanisms.

For example, when the MS requests a PDP context setup, it can request address assignment from its home network (cdma2000) using the radius protocol. As a result of such a request, the GGSN receives an address to be assigned to the MS from the AAA server in the cdma2000 network. A bi-directional tunnel (for example, using the IPsec protocol or another protocol) is created between the GGSN and the router/gateway corresponding to the location of the assigned IP address, and all packets on the forward and reverse link are routed via the tunnel and the router/gateway which is located in the cdma2000 home network of the MS.

As another example, a VPN type of IPsec connection can be established between the MS and a VPN gateway in the home network of the MS. The MS can be pre-configured with the address of a VPN gateway, which can be used whenever the MS is in a GPRS foreign mode of operation.

The following examples describe provision of simple IPv6 service in GPRS/UMTS foreign mode.

The GGSN can provide the MS with an IPv6 Prefix belonging to the Intranet/ISP addressing space which is the home network of the MS (cdma2000) if packets are to be routed via the home network. If not, the IPv6 prefix of the GGSN can be provided to the MS. A dynamic IPv6 address can be given using either stateless or stateful address autoconfiguration. This IPv6 address can be used for packet forwarding within the packet domain and for packet forwarding via the home network when a policy so dictates.

The MS can send an authentication request at PDP context activation, whereby the GGSN node requests user authentication from the home AAA (RADIUS) server which is in the cdma2000 network. The protocol configuration options can be retrieved (if requested by the MS at PDP context activation) from the home AAA server.

In order to avoid any conflict between the link-local address of the MS and that of the GGSN, the Interface-Identifier used by the MS to build its link-local address can be assigned by the GGSN. The GGSN preferably ensures the uniqueness of this interface-identifier. The MT can then enforce the use of this Interface-identifier by the TE. This is valid for both stateless and stateful address autoconfiguration.

The communication between the Packet Domain and the home network of the mobile station (in this example the cdma2000 network) may be performed over any network, even an insecure one such as the Internet. In case of an insecure connection between the GGSN and the Intranet/ISP, a specific security protocol can be used over the insecure connection. This security protocol can be defined for example by mutual agreement between PLMN operator and Intranet/ISP administrator.

The MS may request for DNS server IPv6 addresses using the PCO IE in e.g. the PDP Context Request message. In that case the GGSN may return the IP address of one or more DNS servers in the PCO in the PDP Context Response message.

A VPN solution can also be used as an alternative mechanism to route packets through the home network to/from a MS that is operating in GPRS/UMTS foreign mode.

Figure 4:
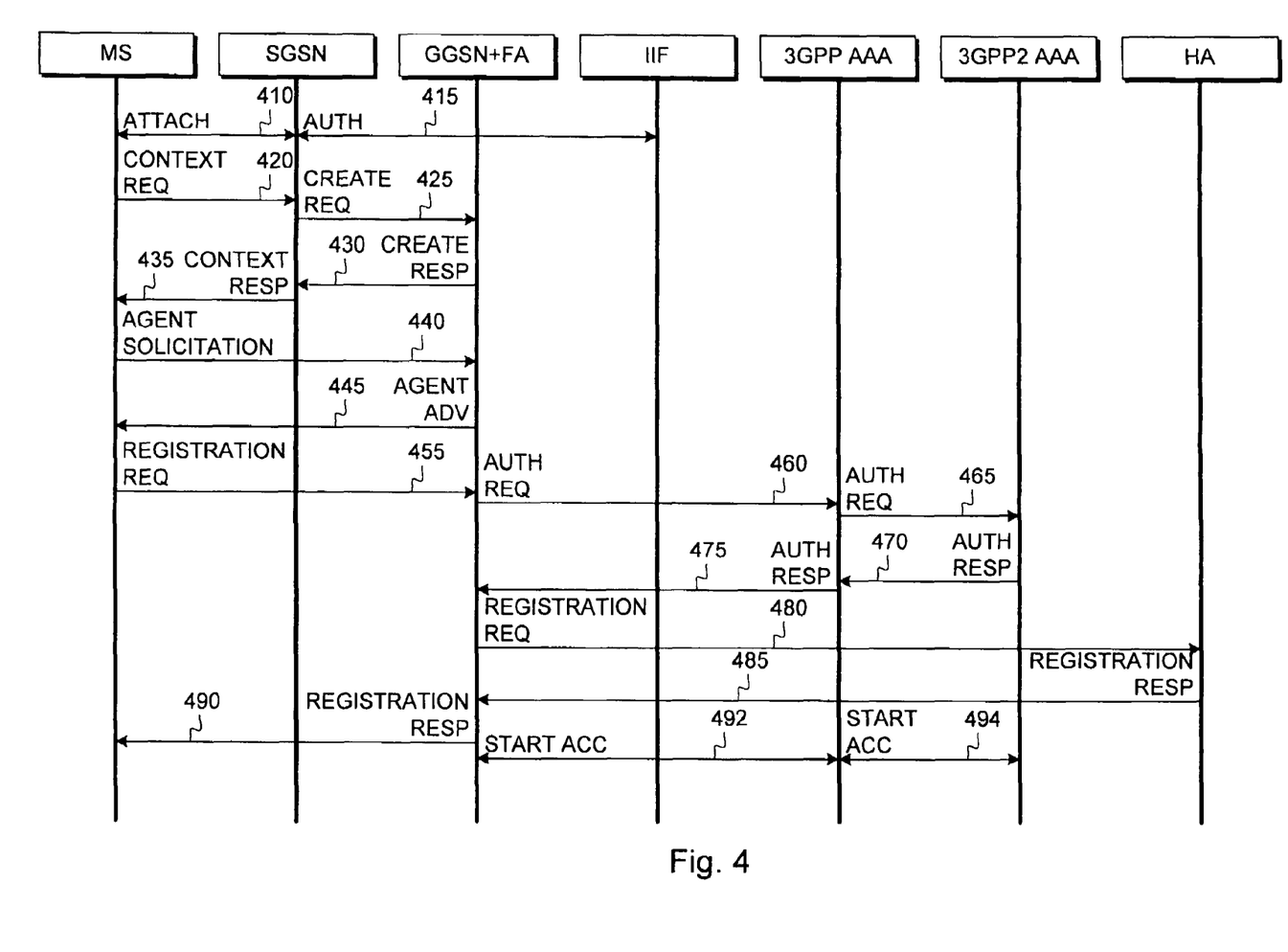
FIG. 4 illustrates provision of mobile IPv4 service in GPRS/UMTS packet data foreign mode.

The following examples describe provision of mobile IPv4 service using Foreign Agent functionality in GPRS/UMTS foreign mode. Mobile IPv4 service in GPRS/UMTS packet data foreign mode requires the presence of a foreign agent in the network, for example in the GGSN node. FIG. 4 illustrates provision of mobile IPv4 service in GPRS/UMTS packet data foreign mode.

In this scenario the mobile station expects to find a foreign agent (FA) in the visited GPRS/UMTS network. The foreign agent function is in this example available at the GGSN node. One possibility of selecting the appropriate GGSN which has foreign agent functionality is to use an APN that directs the PDP context setup to the appropriate GGSN. The following example describes enabling Mobile IPv4 service.

In step 410, the MN performs the GPRS Attach procedure. The GPRS Attach procedure causes the SGSN to authenticate the MN with the HLR/AuC. Since the MN is a cdma2000 homed MN, the HLR/AuC is an IS41-MAP based entity. Hence the IIF gateway is used to authenticate 415 the MN. A successful authentication response from the IIF results in the MN being GPRS Network attached.

In step 420, the MN activates the PDP context setup procedure. It includes the NAI, its home address and an indication requesting Mobile IPv4 service in the Information Elements (IE) of the PDP context activation message. The SGSN sends 425 a create PDP context request to the GGSN.

The GGSN observes that the mobile station is a cdma2000 mobile station requesting Mobile IPv4 service. It creates an IPv4 PDP context and sends in step 430 a PDP context response message to the SGSN. The SGSN forwards 435 the PDP context response message to the mobile station.

In step 440, the mobile station sends an Agent Solicitation message to the GGSN over the PDP context.

In step 445, the Foreign Agent in the GGSN sends a unicast Agent advertisement message to the mobile station in response to the Agent Solicitation message.

In step 450, the mobile station sends a Mobile IPv4 Registration Request message to the Foreign Agent. It includes the MN-AAA and MN-HA authentication extensions in the message in addition to the NAI.

The Foreign Agent extracts the MN-AAA authentication extension and the NAI from the received message and sends 460 a Radius Authentication Request message to the 3GPP AAA server with this information.

Observing that the mobile station is a cdma2000 mobile station, the 3GPP AAA server forwards 465 the authentication request to the 3GPP2 AAA server.

The 3GPP2 AAA server authenticates the Radius Access Auth request and sends 470 a response to the 3GPP AAA server.

In step 475, the 3GPP AAA server forwards the response to the Foreign Agent in the GGSN.

The Foreign Agent verifies the response and forwards 480 the Mobile IPv4 Registration Request to the Home Agent (HA).

The Home Agent authenticates the Registration request and sends 485 a Registration Response to the FA (Foreign Agent).

14. The FA forwards 490 the Registration Response to the mobile station. The foreign agent also sends 492 an Accounting Start message to the 3GPP AAA server, as a response to which the 3GPP AAA server sends 494 a start message to the 3GPP2 server.

At this time Mobile IPv4 has been activated and the mobile station can send and receive data using the home address.

Provision of dynamic home agent and home address assignment can be arranged for example in the following way:

- The mobile station includes in the MIPv4 Registration request a request for assignment of home address and Home agent
- The 3GPP AAA server consequently assigns a Home agent for the mobile station
- The FA receives the AAA response from the 3GPP2 AAA server which includes the Home agent information. The FA forwards the registration request to the Home agent based on that information.
- The Home agent notes that the MN requires a home address. Hence after successful authentication of the registration request, it assigns a home address to the mobile station and indicates the assigned address in the registration response.
- The mobile station invokes the PDP context modify procedure to update the IP address associated with the mobile station for the PDP context that was setup earlier.

If tunnelling of all data via the home network is required, the mobile station can request the FA to create a reverse tunnel for all its data, in which case the FA creates a reverse tunnel between itself and the home agent. All data originated from the mobile station is then forwarded over this tunnel to the home agent, whereby forward and reverse traffic traverses via the home network.

Figure 5:
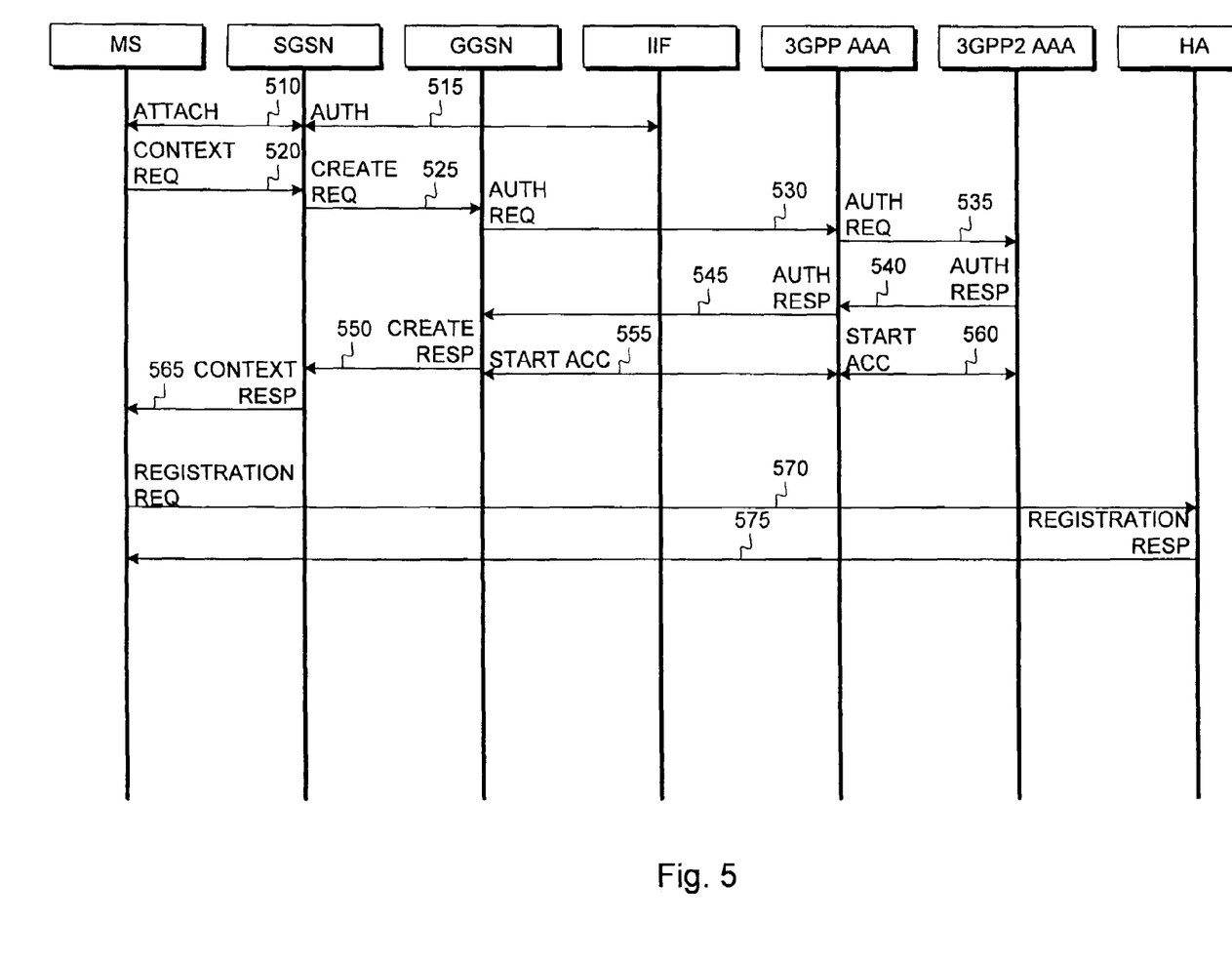
FIG. 5 illustrates provision of mobile IPv4 services using a co-located care-of-address in GPRS/UMTS foreign mode.

The following examples describe provision of mobile IPv4 services using a co-located care-of-address in GPRS/UMTS foreign mode. A mobile station which is capable of tunnelling and detunnelling of IP packets does not require a foreign agent to use Mobile IPv4. The mobile station itself is the end point of the tunnel originating at the home agent. This scenario is illustrated in FIG. 5.

In step 510, the mobile station performs the GPRS Attach procedure. The GPRS Attach procedure requires the SGSN to authenticate the mobile station with the HLR/AuC. Since the mobile station is a cdma2000 homed mobile station, the HLR/AuC is an IS41-MAP based entity. Therefore the IIF gateway is used to authenticate 515 the mobile station. A successful authentication response from the IIF results in the mobile station being GPRS Network attached.

In step 520, the mobile station initiates the PDP context setup procedure. It includes in the context setup request message the NAI and an authenticator for use to authenticate to the AAA infrastructure. The authentication can be for example PAP or CHAP based. The SGSN forwards 525 the request to the GGSN.

The GGSN receives the PDP context request and observes that it is a cdma2000 mobile station and needs to be authenticated with the AAA infrastructure. It creates a Radius Authentication Request message using the parameters in the PDP context setup request and sends 530 the message to the 3GPP AAA server.

The 3GPP AAA server forwards 535 the authentication request to the 3GPP2 AAA server.

The 3GPP2 AAA server authenticates the mobile station and sends 540 an Auth Response back to the 3GPP AAA server.

The 3GPP AAA server sends the response to the GGSN in step 545.

If the authentication is successful, the GGSN creates the PDP context and sends 550 a response message to the SGSN. The GGSN also triggers 555 an Accounting start notification to the 3GPP AAA server. The 3GPP AAA server triggers 560 an Accounting start notification to the 3GPP2 AAA server.

In step 565, the SGSN forwards the PDP context setup response to the mobile station.

The MN then has an IPv4 address and a PDP context over which it can send and receive IP packets. It sends 570 a MIPv4 Registration Request message to the Home Agent. The address of the Home agent and the home address of the mobile station can be for example preconfigured or configured dynamically during the PDP context procedure with the aid of the AAA infrastructure.

The Home agent authenticates the Registration Request message and sends 575 an Authentication Response back to the mobile station, whereafter the MN now has a Mobile IPv4 session in progress.

If the policy of the home network requires all traffic for the mobile station to be routed through the home network it can request the mobile station to create a reverse tunnel from the mobile station to the HA. This will result in all forward and reverse traffic to flow through the home agent located in the home network of the mobile station.

Figure 6:
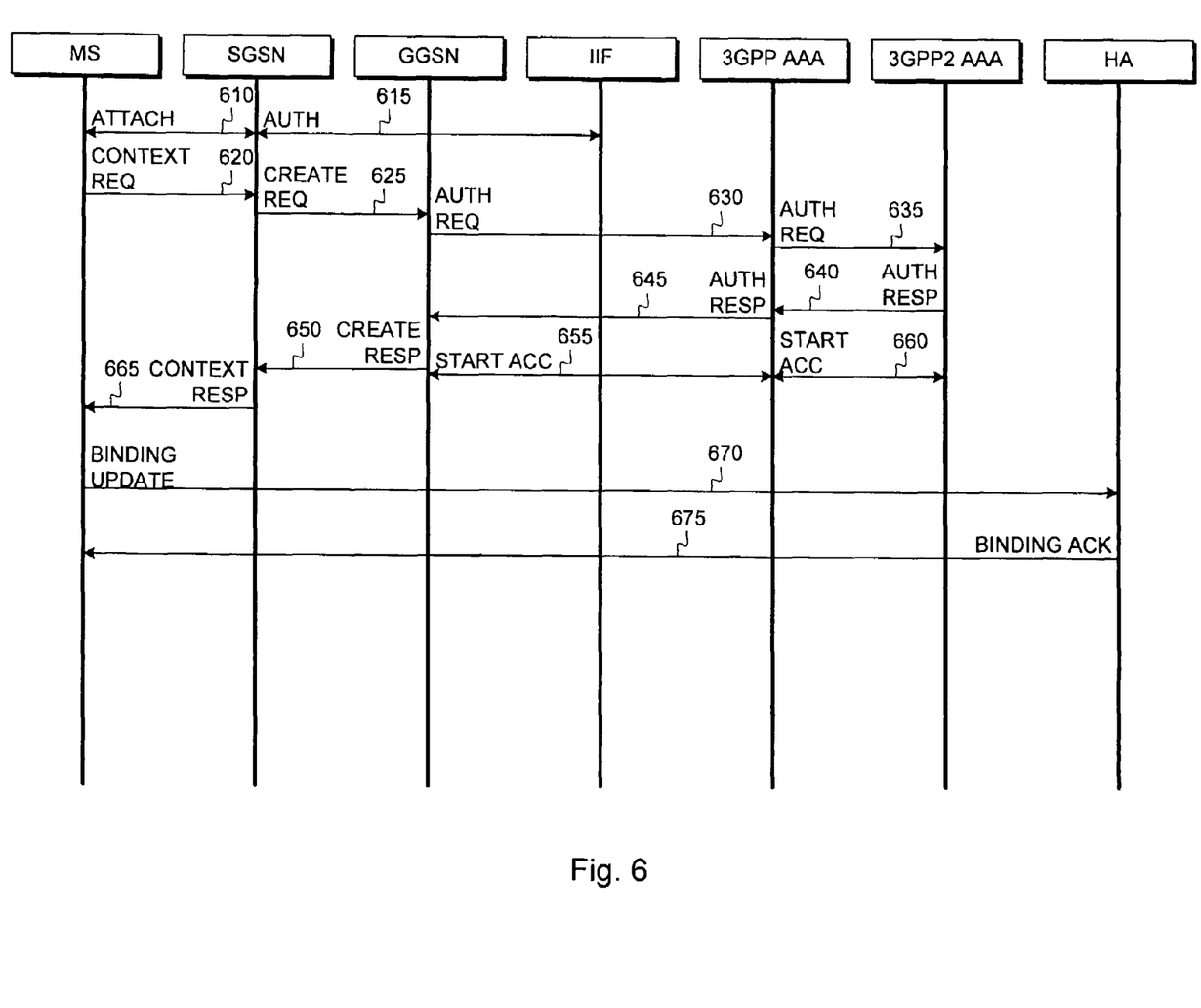
FIG. 6 illustrates provision of mobile IPv6 service in GPRS/UMTS foreign mode.

The following examples describe provision of mobile IPv6 service in GPRS/UMTS foreign mode. Support for Mobile IPv6 is possible when the cdma2000 homed mobile station is operating in GPRS/UMTS foreign mode. FIG. 6 illustrates the sequence of events.

For enabling Mobile IPv6 service, the mobile station needs to initiate an IPv6 PDP context. It uses the address assigned to the IPv6 PDP context as the care-of-address and sends a binding update to its home agent. The sequence of steps are described in the following with reference to FIG. 6.

In step 610, the mobile station performs the GPRS Attach procedure. The GPRS Attach procedure requires the SGSN to authenticate the mobile station with the HLR/AuC. Since the mobile station is a cdma2000 homed mobile station, the HLR/AuC is an IS41-MAP based entity. Therefore the IIF gateway is used to authenticate 615 the mobile station. A successful authentication response from the IIF results in the mobile station being GPRS Network attached.

The mobile station needs to authenticate with the AAA infastructure in the cdma2000 network. In order to do this, the mobile station initiates 620 the PDP context setup procedure in the GPRS network, indicating the type of PDP context requested as type IPv6.

The SGSN forwards 625 the Create PDP context request message to the GGSN which can be selected based on the APN (Access Point Name).

When the GGSN receives this create PDP context message, it observes that this is a request from a cdma2000 homed mobile station based on the information elements such as the NAI. The Radius client in the GGSN extracts the NAI, authentication data and other information and forwards 630 this in a Radius Access Request message to its AAA server. The GGSN can know the identity of the AAA server for example as a result of configuration.

The 3GPP AAA server receives the Radius Access request and based on the realm part of the NAI forwards 635 the request to the 3GPP2 AAA server.

The AAA server in the cdma2000 home network authenticates the mobile station and sends 640 a Radius Accept message back to the 3GPP AAA server.

The 3GPP AAA server forwards 645 the Radius Accept message to the GGSN. The mobile station has now been authenticated by the home network of the mobile station and authorized for packet data access.

The GGSN creates the PDP context and sends 650 the response to the create PDP context message to the SGSN. The GGSN also sends 655 an Accounting start notification to the 3GPP AAA server. The 3GPP AAA server triggers 660 the Accounting start notification to the 3GPP2 AAA server.

The create PDP context response is forwarded 665 by the SGSN to the mobile station. At this point, the mobile station has an IPv6 address and is able to send and receive packets The mobile station sends 670 a binding update to its MIPv6 Home agent. If the binding update is authenticated, the Home agent sends 675 a Binding acknowledgment to the mobile station, whereafter the mobile node has a Mobile IPv6 session in progress.

If the policy of the home network requires all traffic for the mobile station to be routed through the home network it can request the mobile station to create a reverse tunnel from the mobile station to the HA. This will result in all forward and reverse traffic to flow through the home agent located in the home network of the mobile station.

It is noted that while the preceding description illustrates various embodiments of the invention within a 3GPP and a 3GPP2 cellular telecommunications system, the invention is not limited to these systems only, but can be implemented in different types of cellular telecommunication systems as well.

It is also noted herein that while the above describes exemplifying embodiments of the invention, there are several variations and modifications which may be made to the disclosed solution without departing from the scope of the present invention as defined in the appended claims.

The invention claimed is:

1. Method for supporting roaming of a mobile station using packet data connections in a cellular telecommunications network, comprising the steps of receiving a connection initiation message from a mobile station by a serving node, sending a challenge message to the mobile station, receiving a response to the challenge from the mobile station by the serving node, extracting an identifier associated with the mobile station from the received response, sending an access request to an authentication node of the cellular telecommunications network, the access request including the extracted identifier, determining whether the extracted identifier is associated with a second telecommunications network, and if it is, forwarding the access request by the authentication node to a second authentication node in the second telecommunications network, sending an accounting start request from the serving node to the authentication node of the cellular telecommunications network, and if the extracted identifier was determined to be associated with a second telecommunications network, sending an accounting start request to the second authentication node in the second telecommunications network.

2. A method according to claim 1, further comprising the step of converting information in the accounting start request received from the serving node to a second format employed by the second authentication node for transmission to the second authentication node in an accounting start request.

3. A method according to claim 1, wherein the cellular telecommunications network is a CDMA network and the second telecommunications network is a GPRS network.

4. A method according to claim 1, wherein the identifier associated with the mobile station is a network access identifier.

5. A method according to claim 1, wherein the step of converting is performed by the authentication node of the cellular telecommunications network.

6. Method for supporting roaming of a mobile station using packet data connections in a telecommunications network, comprising the steps of receiving a packet data connection request message from a mobile station, extracting an access node identifier from the received request message, determining on the basis of an extracted access node identifier at least the identity of an authentication node in a second telecommunications network, sending an access request message to the authentication node in the second telecommunications network, receiving a response message from the authentication node in the second telecommunications network, and sending an accept message to the mobile station if the response message from the authentication node in the second telecommunications network indicated a successful authentication.

* * * * *